(12) United States Patent
Guiassa et al.

(10) Patent No.: US 12,214,454 B1
(45) Date of Patent: Feb. 4, 2025

(54) SYSTEM AND METHOD FOR MACHINING A WORKPIECE INSTALLED ON A ROTARY TABLE

(71) Applicant: Pratt & Whitney Canada Corp., Longueuil (CA)

(72) Inventors: Rachid Guiassa, Longueuil (CA); Visal Ing, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/518,070

(22) Filed: Nov. 22, 2023

(51) Int. Cl.
  *B23P 15/02* (2006.01)
  *F01D 5/12* (2006.01)
  *G05B 19/402* (2006.01)

(52) U.S. Cl.
  CPC ............... *B23P 15/02* (2013.01); *F01D 5/12* (2013.01); *G05B 19/402* (2013.01); *F05D 2220/323* (2013.01); *F05D 2230/10* (2013.01); *F05D 2240/30* (2013.01); *G05B 2219/40555* (2013.01)

(58) Field of Classification Search
  CPC .... G05B 19/402; G05B 19/19; G05B 19/401; G05B 19/4093; G05B 19/4097
  See application file for complete search history.

(56) References Cited

U.S. PATENT DOCUMENTS

| | | | |
|---|---|---|---|
| 4,841,126 | A | 6/1989 | Graeber |
| 9,383,742 | B2 | 7/2016 | Li |
| 9,784,554 | B2 * | 10/2017 | Gray ..................... G01B 5/25 |
| 10,512,980 | B2 | 12/2019 | Masuda |
| 11,208,891 | B2 | 12/2021 | Ing |
| 11,921,487 | B2 * | 3/2024 | Guiassa ............... G05B 19/186 |
| 11,988,506 | B2 * | 5/2024 | Matsushita ............ B23Q 15/12 |
| 2023/0053168 | A1 * | 2/2023 | Watanabe ............ G05B 19/401 |
| 2023/0088649 | A1 * | 3/2023 | Zimmermann .. G05B 19/41885 700/192 |
| 2023/0158590 | A1 * | 5/2023 | Guiassa ............... G05B 19/404 |
| 2023/0201941 | A1 | 6/2023 | Mondada |
| 2023/0259094 | A1 | 8/2023 | Ing |

* cited by examiner

*Primary Examiner* — Jacob J Cigna
(74) *Attorney, Agent, or Firm* — Getz Balich LLC

(57) ABSTRACT

A machining system includes a machining assembly, a rotary table, a dimensional measurement assembly, and a controller. The controller is configured to control the dimensional measurement assembly to identify first position and a first orientation for a point on a surface of a workpiece with at least one dimensional measurement sensor, determine a first machine-workpiece vector and a first rotation-workpiece vector for the point, control the rotary table to rotate the workpiece about a rotational axis by a rotation angle, calculate a second position and a second orientation for the point subsequent to rotating the workpiece, update a workpiece position and a workpiece orientation in a part coordinate system (PCS) for the workpiece using the second position and the second orientation, and control the machining assembly to machine the workpiece using the updated workpiece position and the updated workpiece orientation.

20 Claims, 7 Drawing Sheets

SYSTEM AND METHOD FOR MACHINING A WORKPIECE INSTALLED ON A ROTARY TABLE

TECHNICAL FIELD

This disclosure relates generally to machining systems methods and, more particularly, to systems and methods for machining a workpiece installed on a rotary table.

BACKGROUND OF THE ART

Machining systems may be used to accomplish one or more workpiece machining (e.g., drilling, grinding, milling, polishing, three-dimensional (3D) printing, etc.) operations for component manufacture. Various machining systems and methods are known in the art. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a machining system for machining a workpiece to form an aircraft engine component includes a machining assembly, a rotary table, a dimensional measurement assembly, and a controller. The machining assembly is configured for machining the workpiece. The rotary table is configured to rotate the workpiece about a rotational axis. The dimensional measurement assembly includes at least one dimensional measurement sensor. The controller includes a processor in communication with a non-transitory memory storing instructions, which instructions when executed by the processor, cause the processor to control the dimensional measurement assembly to identify a first position and a first orientation for a point on a surface of the workpiece with the at least one dimensional measurement sensor, determine a first machine-workpiece vector and a first rotation-workpiece vector for the point, control the rotary table to rotate the workpiece about the rotational axis by a rotation angle, calculate a second position and a second orientation for the point subsequent to rotating the workpiece by rotating the first orientation about the rotational axis by the rotation angle to calculate the second orientation, rotating the first rotation-workpiece vector about the rotational axis by the rotation angle to calculate a second rotation-workpiece vector, and determining a second machine-workpiece vector using the second rotation-workpiece vector to calculate the second position, update a workpiece position and a workpiece orientation in a coordinate system for the workpiece using the second position and the second orientation for the point, and control the machining assembly to machine the workpiece using the updated workpiece position and updated workpiece orientation.

In any of the aspects or embodiments described above and herein, the first machine-workpiece vector may extend between and to a machine origin at the machining assembly and the first position and the second machine-workpiece vector may extend between and to the machine origin and the second position.

In any of the aspects or embodiments described above and herein, the first rotation-workpiece vector may extend between and to a rotation origin at the rotational axis and the first position and the second rotation-workpiece vector may extend between and to the rotation origin and the second position.

In any of the aspects or embodiments described above and herein, determining the first rotation-workpiece vector may include determining the first rotation-workpiece vector using the first machine-workpiece vector and a machine-rotation vector. The machine-rotation vector may extend between and to a machine origin at the machining assembly and a rotation origin at the rotational axis.

In any of the aspects or embodiments described above and herein, the machining assembly may include a wire electric discharge machining (WEDM) system.

In any of the aspects or embodiments described above and herein, the at least one dimensional measurement sensor may include a touch probe.

In any of the aspects or embodiments described above and herein, the instructions, when executed by the processor, may further cause the processor to control the rotary table to hold the workpiece stationary while calculating the second position and the second orientation for each point of the at least one point, updating the workpiece position and the workpiece orientation in the PCS, and controlling the machining assembly to machine the workpiece using the updated workpiece position and updated workpiece orientation.

According to another aspect of the present disclosure, a method for machining a workpiece installed on a rotary table to form an aircraft engine component includes positioning the workpiece on the rotary table, identifying a first position and a first orientation for at least one point on one or more surfaces of the workpiece using at least one dimensional measurement sensor, determining a first machine-workpiece vector and a first rotation-workpiece vector for the at least one point, and machining the workpiece at a plurality of circumferential positions by, for each circumferential position of the plurality of circumferential positions, sequentially: rotating the workpiece with the rotary table about a rotational axis by a rotation angle to one circumferential position of the plurality of circumferential positions, calculating a second position and a second orientation for the at least one point by rotating the first orientation about the rotational axis by the rotation angle to calculate the second orientation, rotating the first rotation-workpiece vector about the rotational axis by the rotation angle to calculate a second rotation-workpiece vector, and determining a second machine-workpiece vector using the second rotation-workpiece vector to calculate the second position, updating a workpiece position and a workpiece orientation for the workpiece using the second position and the second orientation, and machining the workpiece at the one circumferential position with a machining assembly using the updated workpiece position and updated workpiece orientation.

In any of the aspects or embodiments described above and herein, positioning the workpiece on the rotary table may include positioning the workpiece with a centerline axis of the workpiece offset from the rotational axis.

In any of the aspects or embodiments described above and herein, the first machine-workpiece vector may extend between and to a machine origin at the machining assembly and the first position and the second machine-workpiece vector may extend between and to the machine origin and the second position.

In any of the aspects or embodiments described above and herein, the first rotation-workpiece vector may extend between and to a rotation origin at the rotational axis and the first position and the second rotation-workpiece vector may extend between and to the rotation origin and the second position.

In any of the aspects or embodiments described above and herein, determining the first rotation-workpiece vector may include determining the first rotation-workpiece vector using the first machine-workpiece vector and a machine-rotation vector. The machine-rotation vector may extend between and to a machine origin at the machining assembly and a rotation origin at the rotational axis.

In any of the aspects or embodiments described above and herein, the method may further include positioning the rotary table in a predetermined rotational position prior to identifying the first position and the first orientation.

In any of the aspects or embodiments described above and herein, machining the workpiece at the one circumferential position may include forming a slot in the workpiece at the one circumferential position with the machining assembly.

According to another aspect of the present disclosure, a machining system for machining a workpiece to form an aircraft engine component includes a machining assembly, a rotary table, the workpiece, a dimensional measurement assembly, and a controller. The rotary table includes a rotatable platform configured for rotation about a rotational axis. The workpiece is positioned on the rotatable platform. The workpiece has a centerline axis. The workpiece is positioned on the rotary table with the centerline axis offset from the rotational axis. The dimensional measurement assembly includes a touch probe. The controller includes a processor in communication with a non-transitory memory storing instructions including computer numerical control (CNC) instructions, which instructions when executed by the processor, cause the processor to control the dimensional measurement assembly to identify first position and a first orientation for at least one point on one or more surfaces of the workpiece with the touch probe, determine a first machine-workpiece vector and a first rotation-workpiece vector for the at least one point, and machine the workpiece at a plurality of circumferential positions by, for each circumferential position of the plurality of circumferential positions, sequentially controlling the rotary table to rotate the workpiece about the rotational axis by a rotation angle to one circumferential position of the plurality of circumferential positions, determining a second position and a second orientation for each point of the at least one point with the workpiece in the one circumferential position, updating a workpiece position and a workpiece orientation in a coordinate system for the workpiece using the second position and the second orientation, and controlling the machining assembly to machine the workpiece using the updated workpiece position and updated workpiece orientation.

In any of the aspects or embodiments described above and herein, the centerline axis may be skewed relative to the rotational axis.

In any of the aspects or embodiments described above and herein, controlling the machining assembly to machine the workpiece may include controlling the machining assembly to machine the workpiece at the one circumferential position by forming a slot in the workpiece at the one circumferential position with the machining assembly.

In any of the aspects or embodiments described above and herein, determining the second position and the second orientation for each point of the at least one point may include determining the second position and the second orientation for the at least one point without identifying the second position and the second orientation using the touch probe.

In any of the aspects or embodiments described above and herein, the machining assembly may include a wire electric discharge machining (WEDM) system. The WEDM system may include an upper feed member and a lower feed member configured for translation and rotation relative to the workpiece. The upper feed member and the lower feed member may be configured to machine the workpiece using a wire fed between the upper feed member and the lower feed member.

In any of the aspects or embodiments described above and herein, the first position may be different than the second position and the first orientation may be different than the second orientation for each point of the at least one point.

The present disclosure, and all its aspects, embodiments and advantages associated therewith will become more readily apparent in view of the detailed description provided below, including the accompanying drawings.

DETAILED DESCRIPTION

Figure 1:
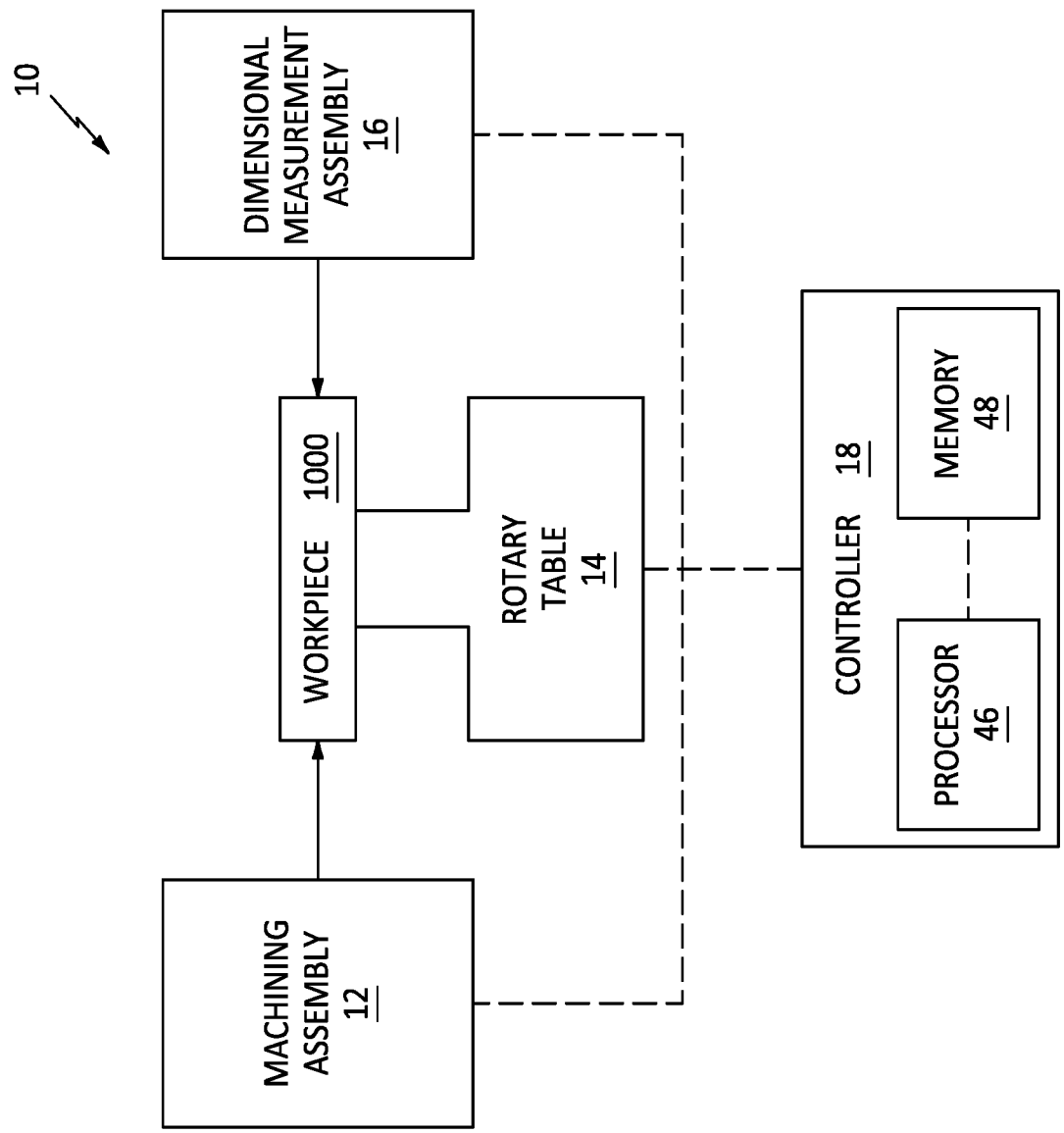
FIG. 1 diagrammatically illustrates a machining system, in accordance with one or more embodiments of the present disclosure.

FIG. 1 diagrammatically illustrates a machining system 10. The machining system 10 of FIG. 1 is a computer numeric control (CNC) machining system configured for automated control of one or more machining tools for use in the machining of a workpiece 1000 to form a machined component. As an example, the workpiece 1000 of FIG. 1 may be machined to form a disk which may form a portion of a bladed rotor (e.g., a bladed turbine rotor, a bladed fan rotor, etc.) of a gas turbine engine for an aircraft propulsion system. The present disclosure, however, is not limited to any particular workpiece 1000 or machined component type, configuration, or material. The machining system 10 of FIG. 1 includes a machining assembly 12, a rotary table 14, a dimensional measurement assembly 16, and a controller 18.

Figure 2:
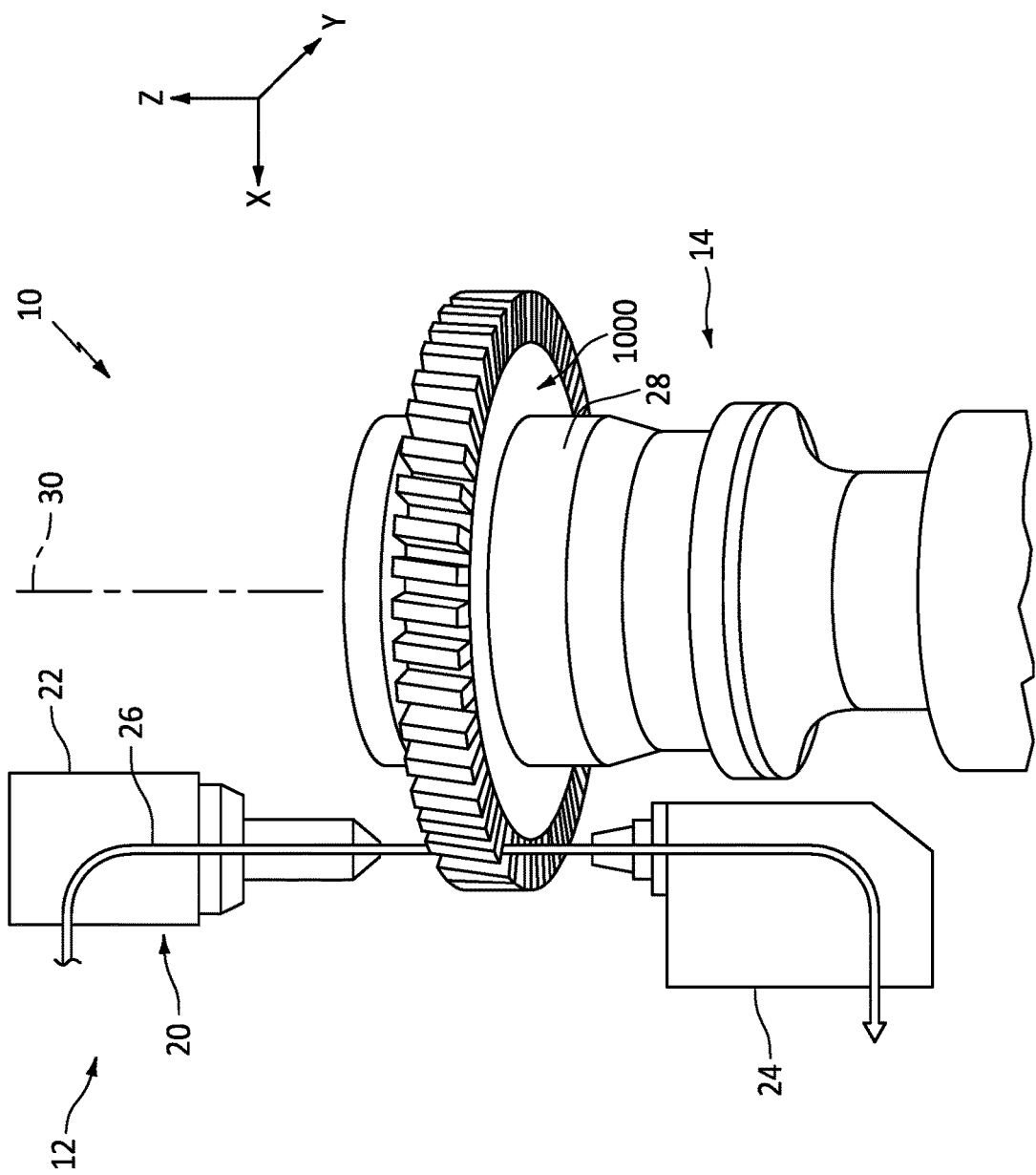
FIG. 2 illustrates a perspective view of a machining assembly and a rotary table for the machining system of FIG. 1, in accordance with one or more embodiments of the present disclosure.

FIG. 2 diagrammatically illustrates a partial cutaway view of the machining assembly 12 and the rotary table 14 relative to the workpiece 1000. The machining assembly 12 of FIG. 2 includes a wire electric discharge machining (WEDM) system 20. The WEDM system 20 of FIG. 2 includes an upper feed member 22 and a lower feed member 24 configured, for example, to continuously feed a wire 26 from the upper feed member 22 to the lower feed member 24 during a machining operation for the workpiece 1000. The WEDM system 20 (e.g., the upper feed member 22 and the lower feed member 24) may be configured to translate along and/or rotate about one or more of an x-axis, a y-axis, and a z-axis. The present disclosure machining assembly 12, however, is not limited to WEDM systems and may alternatively include other configurations of machining (e.g., milling, drilling, grinding, turning, cutting, boring, etc.) systems and tools.

The rotary table 14 includes a rotatable platform 28. The rotatable platform 28 is rotatable about a rotational axis 30 of the rotary table 14. For ease of description, the rotational axis 30 of FIG. 2 may be understood to be oriented along the Z-axis, however, the present disclosure is not limited to this particular orientation of the rotational axis 30. The rotatable platform 28 is configured to securely retain the workpiece 1000 and to rotate the workpiece 1000 about the rotational axis 30 to position the workpiece 1000 relative to the machining assembly 12. The rotatable platform 28 may include fasteners (e.g., mechanical fasteners) and/or other mounting hardware for securely mounting or otherwise retaining the workpiece 1000 on the rotatable platform 28.

Figure 3:
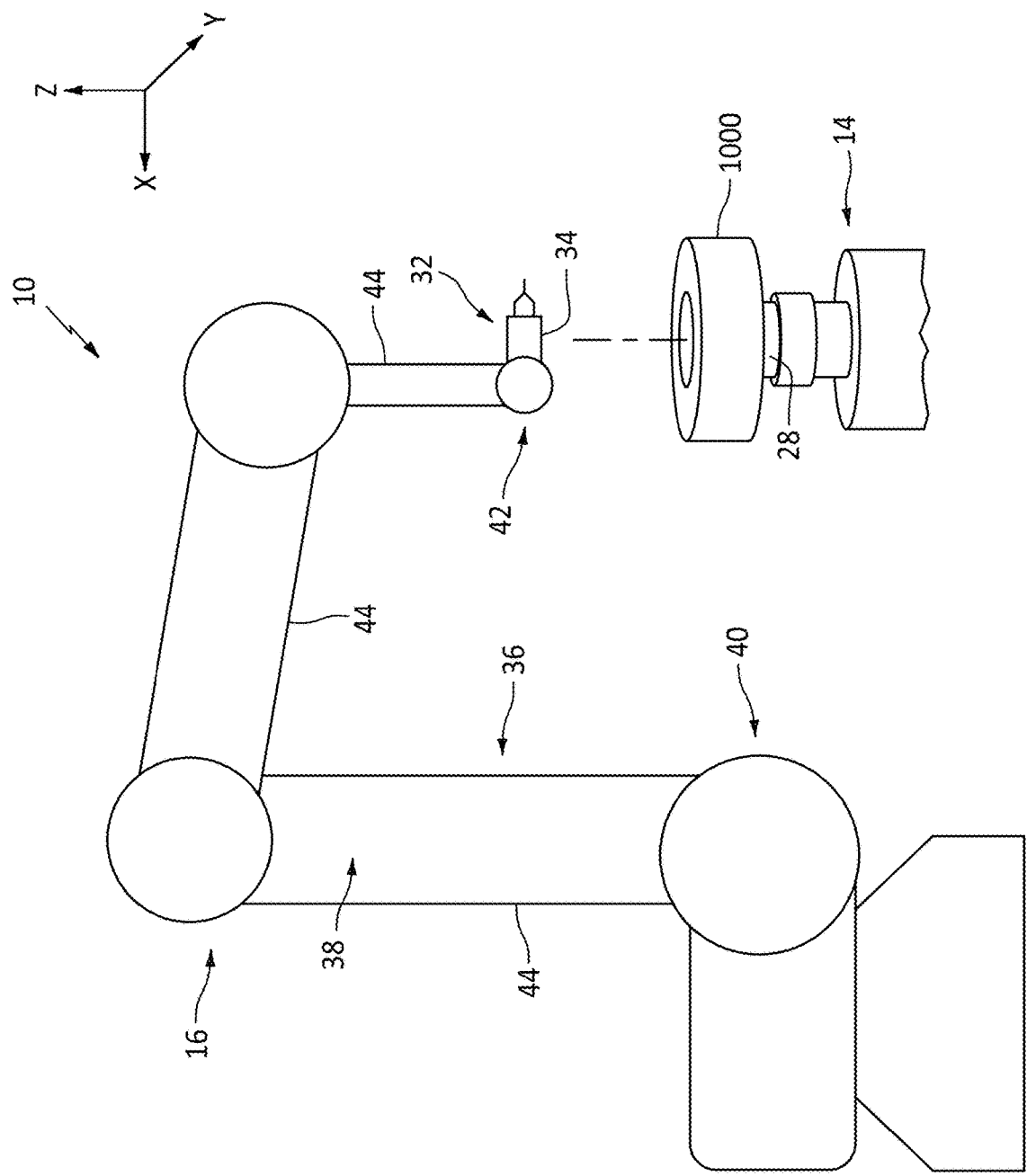
FIG. 3 diagrammatically illustrates a dimensional measurement assembly for the machining system of FIG. 1, in accordance with one or more embodiments of the present disclosure.

FIG. 3 diagrammatically illustrates a side view of the dimensional measurement assembly 16 and the rotary table 14 relative to the workpiece 1000. The dimensional measurement assembly 16 includes one or more dimensional measurement sensors 32. The dimensional measurement sensor 32 of FIG. 3 is configured as a touch probe 34. The touch probe 34 of FIG. 3 is configured to identify positions of the workpiece 1000 (e.g., workpiece surface positions) relative to a three-dimensional coordinate space based on physical contact between the touch probe 34 and the workpiece 1000. For example, the touch probe 34 may be used to measure the shape, size, curvature, and other geometric features of the workpiece 1000 by sensing (e.g., contacting) discrete points on surfaces of the workpiece 1000. The dimensional measurement sensors 32, however, are not limited to touch probes. For example, the dimensional measurement sensors 32 may additionally or alternatively include any dimensional measurement sensor or device configured to measure geometric characteristics of the workpiece 1000 such as, but not limited to, coordinate-measuring machines (CMMs), contact scanning probes, non-contact probes, laser trackers, machine vision systems, optical scanners, optical comparators, and the like.

The dimensional measurement assembly 16 may include a positioning system 36 configured to position the dimensional measurement sensors 32 relative to the workpiece 1000. For example, the positioning system 36 of FIG. 3 includes a robotic arm 38 configured to position the touch probe 34. The robotic arm 38 includes a base end 40, a distal end 42, and one or more movable joints 44 between the base end 40 and the distal end 42. Each movable joint 44 may be moved or otherwise controlled, for example, by an independent servo motor or other actuator. The distal end 42 may be connected to the touch probe 34. The robotic arm 38 is configured move the touch probe 34 relative to the workpiece 1000 and/or to one or more other components of the machining system 10. For example, the robotic arm 38 may be configured to move the touch probe 34 along an x-axis, a y-axis, and a z-axis, as well as to rotate the touch probe 34 relative to the x-axis, the y-axis, and the z-axis (e.g., pitch, yaw, and roll).

Referring again to FIG. 1, the controller 18 is connected in signal communication with the machining assembly 12, the rotary table 14, and the dimensional measurement assembly 16. The controller 18 includes a processor 46 and memory 48. The memory 48 is connected in signal communication with the processor 46. The processor 46 may include any type of computing device, computational circuit, or any type of process or processing circuit capable of executing a series of instructions that are stored in the memory 48, thereby causing the processor 46 to perform or control one or more steps or other processes. The processor 46 may include multiple processors and/or multicore CPUs and may include any type of processor, such as a microprocessor, digital signal processor, co-processors, a microcontroller, a microcomputer, a central processing unit, a field programmable gate array, a programmable logic device, a state machine, logic circuitry, analog circuitry, digital circuitry, etc., and any combination thereof. The instructions stored in memory 48 may represent one or more algorithms for controlling operations of the machining assembly 12, the rotary table 14, and the dimensional measurement assembly 16, and the stored instructions are not limited to any particular form (e.g., program files, system data, buffers, drivers, utilities, system programs, etc.) provided they can be executed by the processor 46. The instructions stored in memory 48 may be in the form of a CNC programming language (e.g., G-code, M-code, etc.), or another suitable programming language which can be executed by the controller 18 and/or its processor 46. For example, the CNC programming language instructions may be executed by the processor 46, for example, to control positioning, movement speed, and a tool path for the WEDM system 20 and/or a rotational position of the rotary table 14 (e.g., the rotatable platform 28). The instructions stored in memory 48 may be generated by computer-aided design (CAD) or computer-aided manufacturing (CAM) software, whereby the physical dimensions of a particular workpiece (e.g., the workpiece 1000) may be translated into instructions (e.g., CNC) instructions). The memory 48 may be a non-transitory computer readable storage medium configured to store instructions that when executed by one or more processors, cause the one or more processors to perform or cause the performance of certain functions. The memory 48 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 18 may be achieved via the use of hardware, software, firmware, or any combination thereof. The controller 18 may also include input and output devices (e.g., keyboards, buttons, switches, touch screens, video monitors, sensor readouts, data ports, etc.) that enable the operator to input instructions, receive data, etc.

During a machining operation for the workpiece 1000, mobility of the machining assembly 12 (e.g., the WEDM system 20) relative to the workpiece 1000 may be limited. For example, the WEDM system 20 may be configured to machine a rotor blade slot (e.g., a firtree slot) in the workpiece 1000 at a circumferential position of the workpiece 1000. With the workpiece 1000 stationary, the WEDM system 20 may not be configured to move to a second circumferential position of the workpiece 1000 to form a second rotor blade slot. The rotary table 14 may rotate the workpiece 1000 about the rotational axis 30 to position the second circumferential position of the workpiece 1000 at (e.g., on, adjacent, or proximate) the WEDM system 20 for machining the second rotor blade slot. However, in at least some cases, the workpiece 1000 may be positioned on (e.g., retained by) the rotary table 14 with eccentricity or otherwise imperfect (e.g., off center) orientation relative to the rotational axis 30. Accordingly, rotation of the workpiece 1000 by the rotary table 14 may cause machining surfaces of the workpiece 1000 to be positioned outside of an expected position range and inconsistent with the CNC instructions executed by the controller 18 to control machining of the workpiece 1000 with the WEDM system 20. For high-precision machining operations, such as those discussed above for forming gas turbine engine rotor disks, this eccentricity or imperfect orientation of the workpiece 1000 on the rotary table 14 may cause the machined workpiece 1000 to fail one or more dimensional tolerance requirements. We have found that eccentricity or imperfect orientation of the workpiece on the rotary table 14 may be prevented or mitigated by using complex fixturing to facilitate precise positioning of the workpiece 1000 on the rotary table 14 and/or by identifying positions of the workpiece 1000 (e.g., using the touch probe 34) after each movement of the rotary table 14 to rotate the workpiece 1000. However, these solutions may add considerable time, complexity, and expense to a machining process for the workpiece 1000.

Figure 4:
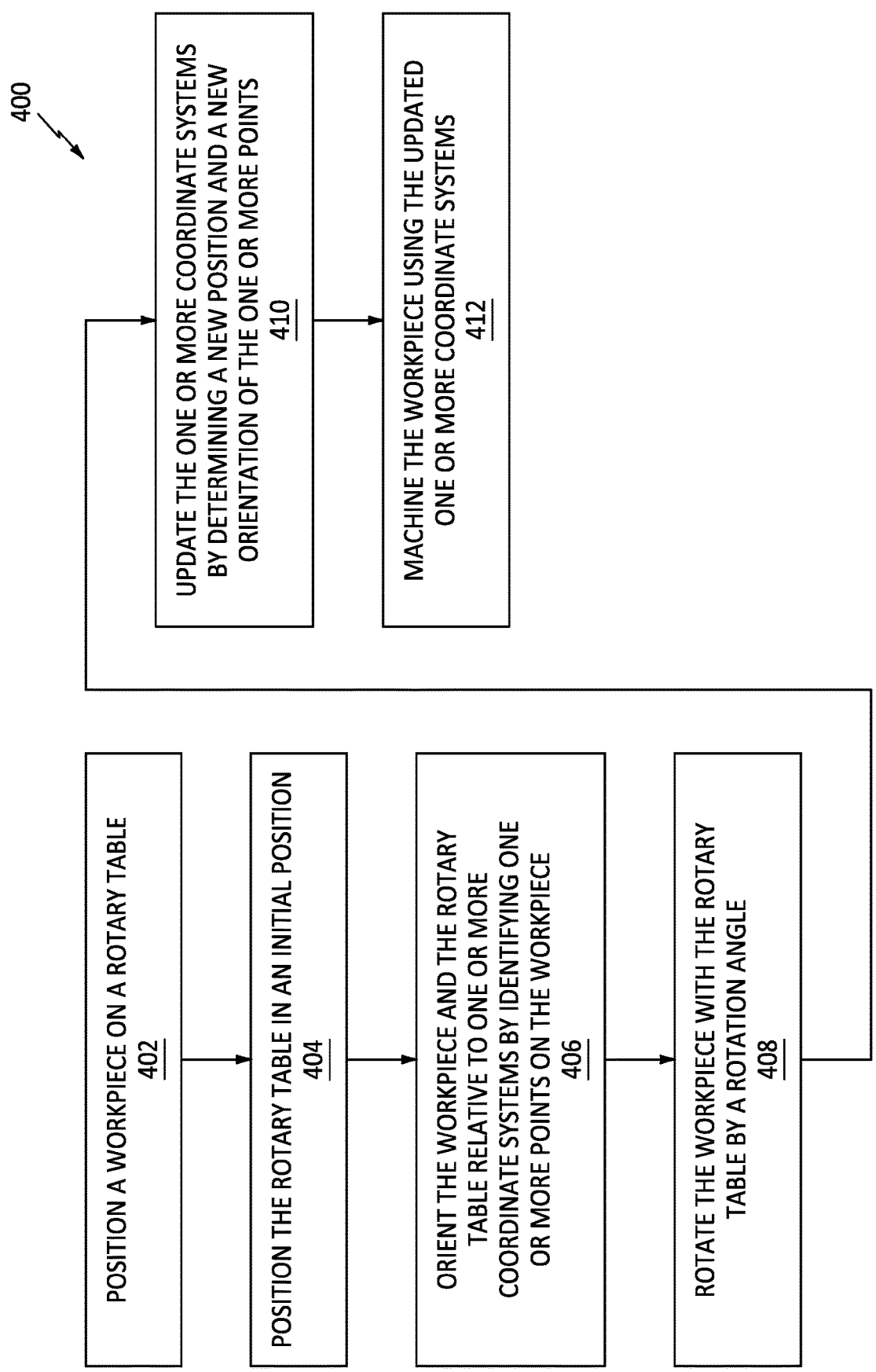
FIG. 4 illustrates a block diagram depicting a method for machining a workpiece installed on a rotary table, in accordance with one or more embodiments of the present disclosure.

Referring to FIG. 4, a method 400 for machining a workpiece installed on a rotary table is provided. FIG. 4 illustrates a flowchart for the Method 400. The Method 400 may be performed using the machining system 10, as described herein. The controller 18 may be used to execute or control one or more steps of the Method 400. For example, the processor 46 may execute instructions stored in memory 48, thereby causing the controller 18 and/or its processor 46 to execute or otherwise control one or more steps of the Method 400 using the machining assembly 12, the rotary table 14, and/or the dimensional measurement assembly 16. However, it should be understood that the Method 400 is not limited to use with the machining system 10 described herein. Unless otherwise noted herein, it should be understood that the steps of Method 400 are not required to be performed in the specific sequence in which they are discussed below and, in various embodiments, the steps of Method 400 may be performed separately or simultaneously. Further, it should be understood that not all of the steps of the method 400, discussed below, may be required unless otherwise described herein.

Figure 5:
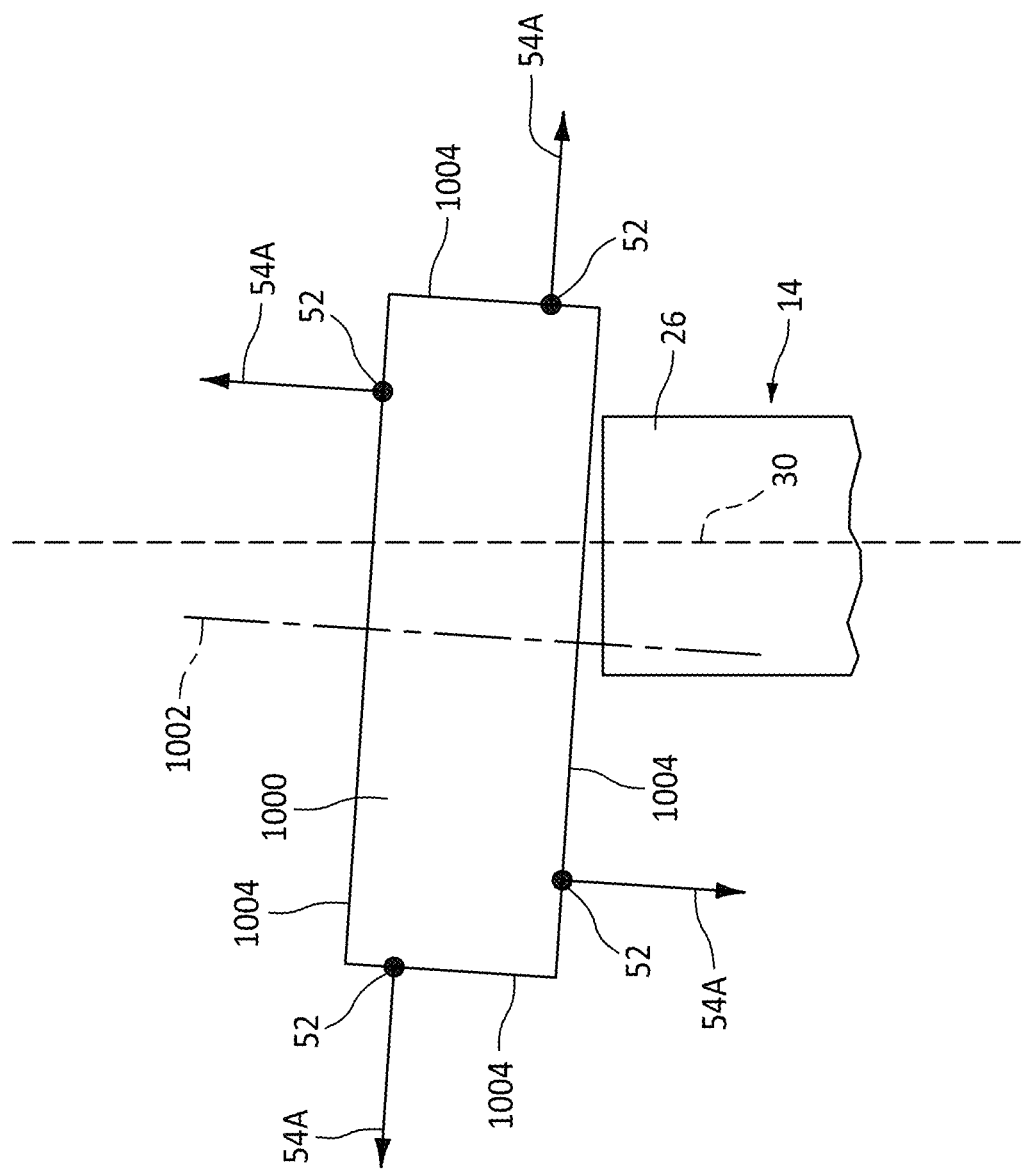
FIG. 5 diagrammatically illustrates a side view of a workpiece positioned on the rotary table, in accordance with one or more embodiments of the present disclosure.

Step 402 includes positioning the workpiece 1000 on the rotatable platform 28 of the rotary table 14. FIG. 5 diagrammatically illustrates a side view of the workpiece 1000 positioned on the rotary table 14 (e.g., the rotatable platform 28). Step 402 may further include mounting or otherwise securing the workpiece 1000 on the rotatable platform, for example, using fasteners (e.g., mechanical fasteners) and/or other mounting hardware. With the workpiece 1000 positioned on the rotary table 14 (e.g., the rotatable platform 28), the workpiece 1000 may have an eccentric or otherwise imperfect (e.g., off center) orientation relative to the rotational axis 30 as shown, for example, in FIG. 5. The imperfect orientation of the workpiece 1000 of FIG. 5 and subsequent figures (see FIG. 7) relative to the rotational axis 30 may be understood to be exaggerated for the purpose of clarifying aspects of the present disclosure. The workpiece 1000 of FIG. 5 has a centerline axis 1002. In a perfectly aligned condition of the workpiece 1000, the centerline axis 1002 may be understood to be colinear with the rotational axis 30. With the workpiece 1000 having an imperfect orientation relative to the rotational axis 30, as shown in FIG. 5, the centerline axis 1002 may, for example, be skewed, slanted, and/or radially offset relative to the rotational axis 30.

Step 404 may optionally include positioning the rotary table 14 (e.g., the rotatable platform 28) in an initial (e.g., default) circumferential position. For example, step 404 may include rotating the rotatable platform 28 from a current circumferential position to the initial circumferential position.

Figure 6:
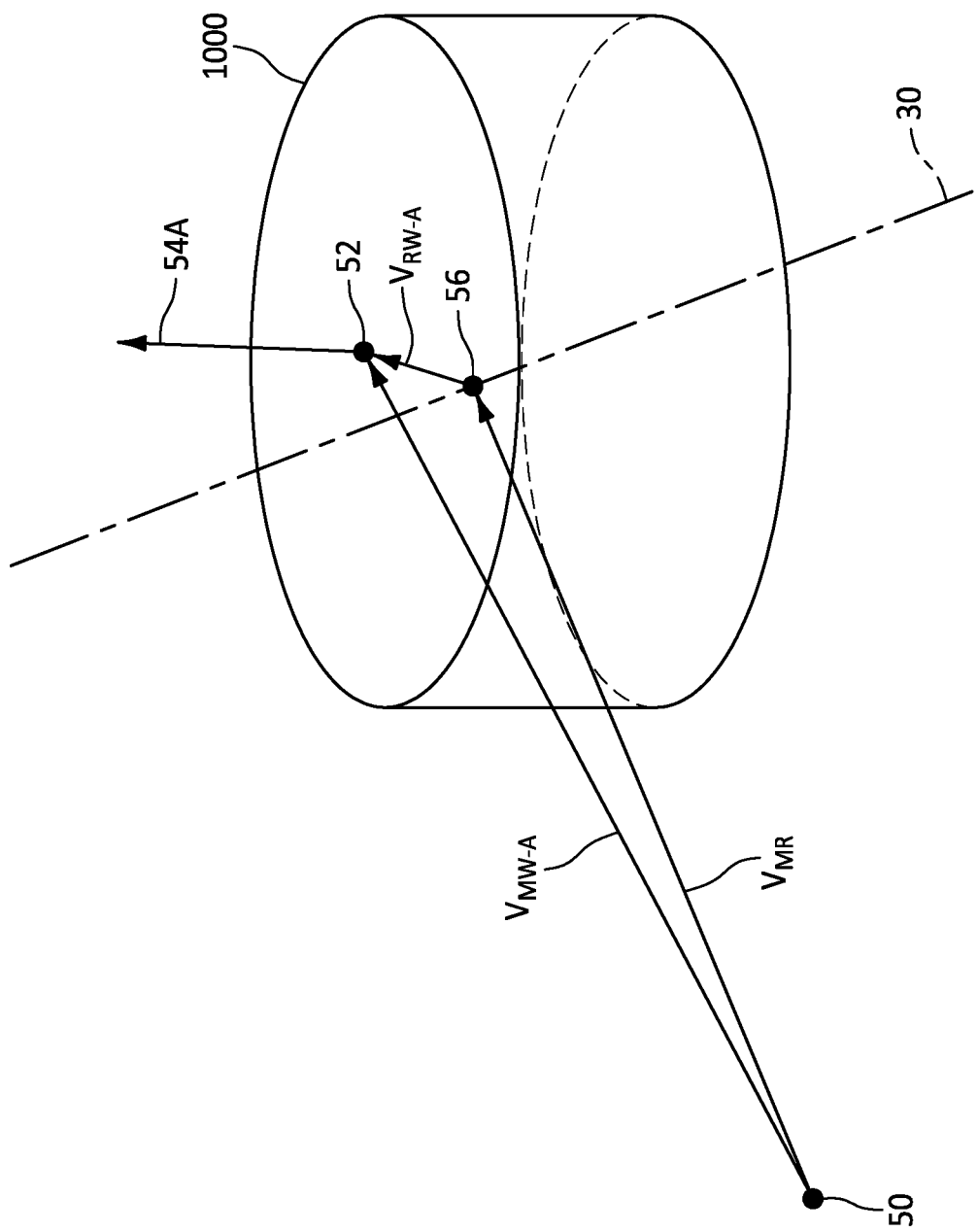
FIG. 6 diagrammatically illustrates the workpiece relative to a rotational axis of the rotary table, in accordance with one or more embodiments of the present disclosure.

Step 406 includes orienting the workpiece 1000 and the rotary table 14 relative to one or more coordinate systems (e.g., cartesian coordinate systems) used by the controller 18 to control functions of the machining system 10 and its components using the CNC instructions. The coordinate systems may include, but are not limited to, a machine coordinate system (MCS) for the machining assembly 12, a rotation coordinate system (RCS) for the rotary table 14, and/or a part coordinate system (PCS) for the workpiece 1000 (see FIGS. 1-3). Each of the coordinate systems may represent a reference frame for the workpiece 1000, the machining assembly 12, the rotary table 14, and/or the dimensional measurement assembly 16. As shown in FIG. 6, for example, the MCS may be oriented relative to a machine origin 50 (e.g., a position) at (e.g., on, adjacent, or proximate) the machining assembly 12. The MCS may be used as a global coordinate system for the machining system 10. For example, in addition to the machining assembly 12, positions and orientations of the workpiece 1000 (e.g., expressed in the PCS) and the rotary table 14 (e.g., expressed in the RCS) may additionally be identified and expressed by the controller 18 using the MCS, or vice versa.

Referring to FIGS. 5 and 6, step 406 includes identifying one or more points 52 (e.g., surface positions) on the workpiece 1000 using the dimensional measurement assembly 16 to orient the workpiece 1000 relative to the machining system 10 (e.g., relative to the MCS; see FIG. 1). For example, the controller 18 may control the positioning system 36 to position the touch probe 34 to contact surfaces 1004 of the workpiece 1000 at the points 52 (see FIG. 3) with the rotatable platform 28 in the initial circumferential position. For each of the points 52, the controller 18 may determine a position (e.g., a geometric origin for the workpiece 1000) of the respective one of the points 52. The position may be represented, for example, by an x, y, and z position of the respective one of the points 52 relative to the MCS. The controller 18 may further determine an initial orientation 54A of each of the points 52 at the respective position. The initial orientation 54A may be orthogonal or substantially orthogonal to the surface 1004 at the position. The dimensional measurement assembly 16 may be used, for example to identify the points 52 at the axial and radial sides of the workpiece 1000 relative to the centerline axis 1002. Using the identified points 52 and predetermined dimensions of the workpiece 1000 (e.g., a three-dimensional (3D) model stored in the memory 48), the controller 18 may orient the workpiece 1000. For example, the controller 18 may apply a best-fit analysis using the identified points 52 and the predetermined dimensions of the workpiece 1000 to orient the workpiece (e.g., relative to the PCS). Subsequent to identification of the plurality of points 52 on the workpiece 1000 using the dimensional measurement assembly 16, as discussed above for step 406, no further dimensional measurement of the workpiece 1000 (e.g., using the dimensional measurement assembly 16) may be required for machining the workpiece 1000 in accordance with the present disclosure method 400.

Step 406 includes, for one, more than one, or each of the points 52, determining (e.g., with the controller 18) an initial machine-workpiece vector $V_{MW-A}$ and an initial rotation-workpiece vector $V_{RW-A}$ in the MCS. The initial machine-workpiece vector $V_{MW-A}$ extends between and to the machine origin 50 and the position of the respective one of the points 52. The initial machine-workpiece vector $V_{MW-A}$ is determined using the position of the respective one of the points 52 identified using the dimensional measurement assembly 16. The initial rotation-workpiece vector $V_{RW-A}$ extends between and to a rotation origin 56 and the position of the respective one of the points 52. The rotation origin 56 is a point on the rotational axis 30. The initial rotation-workpiece vector $V_{RW-A}$ may be calculated by the controller 18 using a machine-rotation vector $V_{MR}$ and the machine-workpiece vector $V_{MW-A}$. The machine-rotation vector $V_{MR}$ extends between and to the machine origin 50 and the rotation origin 56 of the rotational axis 30. The position of the rotation origin 56, the orientation of the rotational axis 30, and the machine-rotation vector $V_{MR}$ may be predetermined values (e.g., experimentally determined values for the machining system 10) expressed relative to the MCS and stored (e.g., in the memory 48). A value of the initial rotation-workpiece vector $V_{RW-A}$ may be calculated using the following equation [1]:

$$V_{RW-A} = V_{MW-A} - V_{MR}$$

Figure 8:
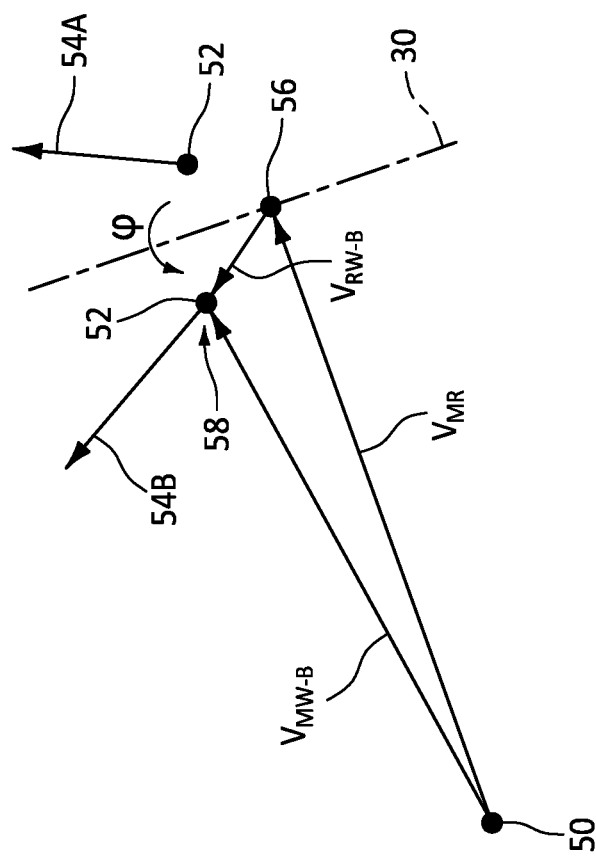
FIG. 8 diagrammatically illustrates the workpiece relative to the rotational axis of the rotary table following the rotation process for the workpiece, in accordance with one or more embodiments of the present disclosure.
Figure 7:
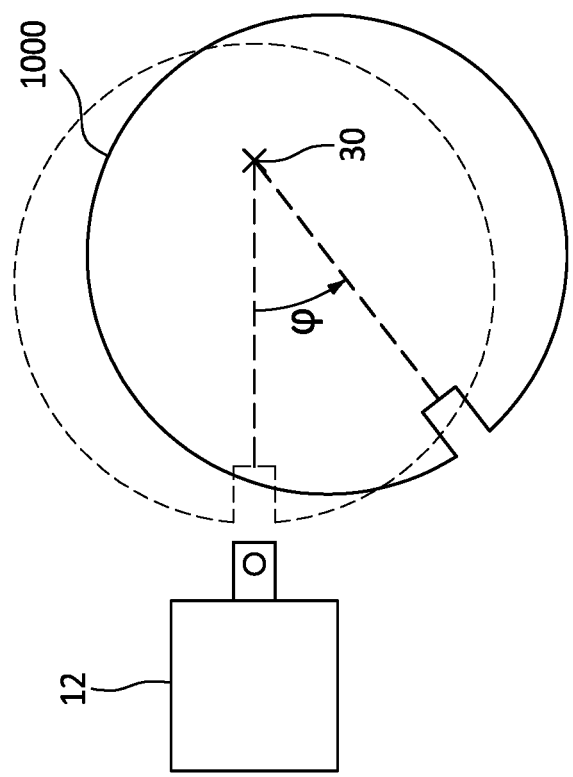
FIG. 7 diagrammatically illustrates a top view of the workpiece depicting a rotation process for the workpiece, in accordance with one or more embodiments of the present disclosure.

Referring to FIGS. 7 and 8, step 408 includes rotating the workpiece 1000 with the rotary table 14 (e.g., the rotatable platform 28) to position the workpiece 1000 relative to the machining assembly 12 for a machining operation. FIG. 7 diagrammatically illustrates a top view of the workpiece 1000 depicting rotation of the workpiece 1000 about the rotational axis 30. FIG. 8 diagrammatically illustrates one of the points 52 on the workpiece 1000 before and after rotation of the workpiece 1000. The controller 18 may identify a rotation angle φ (e.g., from the CNC instructions for the workpiece 1000) to align a circumferential position of the workpiece 1000 with the machining assembly 12 to form a geometric feature (e.g., a slot) at the circumferential position of the workpiece 1000. The controller 18 may control the rotary table 14 to rotate the workpiece 1000 by an amount equal to or substantially equal to the rotation angle φ to position the workpiece 1000 relative to the machining assembly 12. The controller 18 may control rotation of the workpiece 1000 from the initial circumferential position (see step 404) to a circumferential position of a first machining process for the workpiece 1000 or from a circumferential position of a completed machining process to a new circumferential position for a next sequential machining process.

Step 410 includes updating a coordinate system (e.g., the PCS) for the workpiece 1000 for the change in workpiece 1000 position subsequent to rotating the workpiece 1000 by the rotation angle q (see step 408). Updating the coordinate system includes determining (e.g., with the controller 18) a new orientation and a new position for the workpiece 1000 subsequent to rotating the workpiece 1000 by the rotation angle φ.

Determining the new orientation for the workpiece 1000 includes determining, for one, more than one, or each of the points 52, a new orientation 54B in the coordinate system (e.g., the PCS) subsequent to rotating the workpiece 1000 by the rotation angle φ. The controller 18 may calculate the new orientation 54B for one of the points 52 by rotating the initial orientation 54A for the respective one of the points 52 about the rotational axis 30, for example, using Rodrigues' rotational formula or another suitable method for calculating the new orientation 54A. For example, the new orientation 54B subsequent to rotation by the rotation angle φ may be identified using the following equation [2], where the new orientation 54B may be expressed using $P'_x$, $P'_y$, $P'_z$ and the rotation axis 30 may be expressed using $n_x$, $n_y$, $n_z$:

$$P_x' = (\cos \varphi + P_x^2(1-\cos \varphi))n_x + (P_xP_y(1-\cos \varphi) - P_z \sin \varphi)n_y + (P_y \sin \varphi + P_xP_z(1-\cos \varphi))n_2$$

$$P_y' = (P_z \sin \varphi + P_xP_y(1-\cos \varphi))n_x + (\cos \varphi + P_y^2(1-\cos \varphi))n_y + (P_yP_z(1-\cos \varphi) - P_z \sin \varphi)n_z$$

$$P_z' = (P_xP_z(1-\cos \varphi) - P_y \sin \varphi)n_x + (P_z \sin \varphi + P_yP_z(1-\cos \varphi))n_y + (\cos \varphi + P_z^2(1-\cos \varphi))n_z$$

Determining the new position for the workpiece 1000 includes determining, for one, more than one, or each of the points 52, a new position 58 in the coordinate system (e.g., the PCS) subsequent to rotating the workpiece 1000 by the rotation angle φ. The controller 18 may calculate the new position 58 for one of the points 52 by rotating the initial rotation-workpiece vector $V_{RW-A}$ about the rotational axis 30 to determine a new rotation-workpiece vector $V_{RW-B}$ for example, using Rodrigues' rotational formula or another suitable method for determining the new rotation-workpiece vector $V_{RW-B}$ such as, but not limited to, Equation [2] above. The new rotation-workpiece vector $V_{RW-B}$ may be used to calculate the new position 58 in the MCS by determining a new machine-workpiece vector $V_{MW-B}$. The new rotation-workpiece vector $V_{RW-B}$ may be calculated by the controller 18 using machine-rotation vector $V_{MR}$ and the machine-workpiece vector $V_{MW-A}$. For example, a value of the rotation-workpiece vector $V_{RW-A}$ may be calculated using the following equation [3]:

$$V_{MW-B} = V_{MR} + V_{RW-B}$$

The controller 18 may update the position and the orientation of the workpiece 1000 for the PCS using the new orientation 54B and the new position 58 for each of the points 52. In some embodiments, the controller 18 may optionally control the dimensional measurement assembly 16 to identify one or more points on the workpiece 1000 to validate the updated position and the updated orientation for the workpiece 1000 using measured (e.g., real) positions and orientations of the workpiece 1000. However, as previously discussed, subsequent to identification of the plurality of points 52 on the workpiece 1000 using the dimensional measurement assembly 16, no further dimensional measurement of the workpiece 1000 (e.g., using the dimensional measurement assembly 16) may be required for machining the workpiece 1000 under the present disclosure method 400.

Step 412 includes machining the workpiece 1000 with the machining assembly 12 subsequent to rotating the workpiece 1000 by the rotation angle φ (see step 408) and updating the PCS for the change in the position of the workpiece 1000 (see step 410). The controller 18 may execute the CNC instructions using the updated PCS position and orientation of the workpiece 1000 to control the machining assembly 12 to machine the workpiece 1000 to form one or more geometric features of the workpiece 1000. For example, the controller 18 may control the WEDM system 20 of FIG. 2 to form a geometric feature (e.g., a rotor blade slot) of the workpiece 1000. In operation of the WEDM system 20 of FIG. 2, the wire 26 is continuously fed from the upper feed member 22 to the lower feed member 24. The motion of the wire 26 at (e.g., on, adjacent, or proximate) the workpiece 1000 generates sparks between the wire 26 and the workpiece 1000 as the wire is fed from the upper feed member 22 to the lower feed member 24, thereby allowing the WEDM system 20 to cut the workpiece 1000 as necessary to form geometric features of a machined component (e.g., a rotor disk for a bladed rotor).

The steps 408, 410, and 412 may be repeated as necessary to machine the workpiece 1000 to form a machined component. For example, the steps 408, 410, and 412 may be sequentially performed to machine the workpiece 1000 at a plurality of circumferential positions of the workpiece 1000.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A machining system for machining a workpiece to form an aircraft engine component, the machining system comprising:
    a machining assembly configured for machining the workpiece;
    rotary table configured to rotate the workpiece about a rotational axis;
    a dimensional measurement assembly including at least one dimensional measurement sensor; and
    a controller including a processor in communication with a non-transitory memory storing instructions, which instructions when executed by the processor, cause the processor to:
        control the dimensional measurement assembly to identify a first position and a first orientation for a point on a surface of the workpiece with the at least one dimensional measurement sensor;
        determine a first machine-workpiece vector and a first rotation-workpiece vector for the point;
        control the rotary table to rotate the workpiece about the rotational axis by a rotation angle;
        calculate a second position and a second orientation for the point subsequent to rotating the workpiece by rotating the first orientation about the rotational axis by the rotation angle to calculate the second orientation, rotating the first rotation-workpiece vector about the rotational axis by the rotation angle to calculate a second rotation-workpiece vector, and determining a second machine-workpiece vector using the second rotation-workpiece vector to calculate the second position;
        update a workpiece position and a workpiece orientation in a coordinate system for the workpiece using the second position and the second orientation for the point; and
        control the machining assembly to machine the workpiece using the updated workpiece position and the updated workpiece orientation.

2. The machining system of claim 1, wherein the first machine-workpiece vector extends between and to a machine origin at the machining assembly and the first position and the second machine-workpiece vector extends between and to the machine origin and the second position.

3. The machining system of claim 1, wherein the first rotation-workpiece vector extends between and to a rotation origin at the rotational axis and the first position and the second rotation-workpiece vector extends between and to the rotation origin and the second position.

4. The machining system of claim 1, wherein determining the first rotation-workpiece vector includes determining the first rotation-workpiece vector using the first machine-workpiece vector and a machine-rotation vector, and the machine-rotation vector extends between and to a machine origin at the machining assembly and a rotation origin at the rotational axis.

5. The machining system of claim 1, wherein the machining assembly includes a wire electric discharge machining (WEDM) system.

6. The machining system of claim 1, wherein the at least one dimensional measurement sensor includes a touch probe.

7. The machining system of claim 1, wherein the instructions, when executed by the processor, further cause the processor to control the rotary table to hold the workpiece stationary while calculating the second position and the second orientation for each point of the at least one point, updating the workpiece position and the workpiece orientation in the coordinate system, and controlling the machining assembly to machine the workpiece using the updated workpiece position and updated workpiece orientation.

8. A method for machining a workpiece installed on a rotary table to form an aircraft engine component, the method comprising:
   positioning the workpiece on the rotary table;
   identifying a first position and a first orientation for at least one point on one or more surfaces of the workpiece using at least one dimensional measurement sensor;
   determining a first machine-workpiece vector and a first rotation-workpiece vector for the at least one point; and
   machining the workpiece at a plurality of circumferential positions by, for each circumferential position of the plurality of circumferential positions, sequentially:
      rotating the workpiece with the rotary table about a rotational axis by a rotation angle to one circumferential position of the plurality of circumferential positions;
      calculating a second position and a second orientation for the at least one point by rotating the first orientation about the rotational axis by the rotation angle to calculate the second orientation, rotating the first rotation-workpiece vector about the rotational axis by the rotation angle to calculate a second rotation-workpiece vector, and determining a second machine-workpiece vector using the second rotation-workpiece vector to calculate the second position;
      updating a workpiece position and a workpiece orientation for the workpiece using the second position and the second orientation for the at least one point; and
      machining the workpiece at the one circumferential position with a machining assembly using the updated workpiece position and updated workpiece orientation.

9. The method of claim 8, wherein positioning the workpiece on the rotary table includes positioning the workpiece with a centerline axis of the workpiece offset from the rotational axis.

10. The method of claim 8, wherein the first machine-workpiece vector extends between and to a machine origin at the machining assembly and the first position and the second machine-workpiece vector extends between and to the machine origin and the second position.

11. The method of claim 8, wherein the first rotation-workpiece vector extends between and to a rotation origin at the rotational axis and the first position and the second rotation-workpiece vector extends between and to the rotation origin and the second position.

12. The method of claim 8, wherein determining the first rotation-workpiece vector includes determining the first rotation-workpiece vector using the first machine-workpiece vector and a machine-rotation vector, and the machine-rotation vector extends between and to a machine origin at the machining assembly and a rotation origin at the rotational axis.

13. The method of claim 8, further comprising positioning the rotary table in a predetermined rotational position prior to identifying the first position and the first orientation.

14. The method of claim 8, wherein machining the workpiece at the one circumferential position includes forming a slot in the workpiece at the one circumferential position with the machining assembly.

15. A machining system for machining a workpiece to form an aircraft engine component, the machining system comprising:
   a machining assembly;
   rotary table including a rotatable platform configured for rotation about a rotational axis;
   the workpiece positioned on the rotatable platform, the workpiece has a centerline axis, and the workpiece is positioned on the rotary table with the centerline axis offset from the rotational axis;
   a dimensional measurement assembly including a touch probe; and
   a controller including a processor in communication with a non-transitory memory storing instructions including computer numerical control (CNC) instructions, which instructions when executed by the processor, cause the processor to:
      control the dimensional measurement assembly to identify a first position and a first orientation for at least one point on one or more surfaces of the workpiece with the touch probe;
      determine a first machine-workpiece vector and a first rotation-workpiece vector for the at least one point; and
      machine the workpiece at a plurality of circumferential positions by, for each circumferential position of the plurality of circumferential positions, sequentially:
         controlling the rotary table to rotate the workpiece about the rotational axis by a rotation angle to one circumferential position of the plurality of circumferential positions;
         determining a second position and a second orientation for each point of the at least one point with the workpiece in the one circumferential position;
         updating a workpiece position and a workpiece orientation in a coordinate system for the workpiece using the second position and the second orientation; and
         controlling the machining assembly to machine the workpiece using the updated workpiece position and updated workpiece orientation.

16. The machining system of claim 15, wherein the centerline axis is skewed relative to the rotational axis.

17. The machining system of claim 15, wherein controlling the machining assembly to machine the workpiece includes controlling the machining assembly to machine the workpiece at the one circumferential position by forming a slot in the workpiece at the one circumferential position with the machining assembly.

18. The machining system of claim 15, wherein determining the second position and the second orientation for each point of the at least one point includes determining the second position and the second orientation for the at least one point without identifying the second position and the second orientation using the touch probe.

19. The machining system of claim 15, wherein the machining assembly includes a wire electric discharge machining (WEDM) system, the WEDM system includes an upper feed member and a lower feed member configured for translation and rotation relative to the workpiece, and the upper feed member and the lower feed member are configured to machine the workpiece using a wire fed between the upper feed member and the lower feed member.

20. The machining system of claim 15, wherein the first position is different than the second position and the first orientation is different than the second orientation for each point of the at least one point.

* * * * *